United States Patent
Huang

(10) Patent No.: US 8,305,688 B2
(45) Date of Patent: Nov. 6, 2012

(54) ARTICLE HAVING METAL DIELECTRIC REFLECTIVE FILM

(75) Inventor: Chien-Hao Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 423 days.

(21) Appl. No.: 12/649,540

(22) Filed: Dec. 30, 2009

(65) Prior Publication Data

US 2011/0051244 A1 Mar. 3, 2011

(30) Foreign Application Priority Data

Aug. 31, 2009 (CN) .......................... 2009 1 0306374

(51) Int. Cl.
*G02B 1/10* (2006.01)
(52) U.S. Cl. ......................... 359/588; 359/584; 359/585
(58) Field of Classification Search .......... 359/580–590, 359/838–839, 885, 888
See application file for complete search history.

(56) References Cited

U.S. PATENT DOCUMENTS

| 5,337,191 A | * | 8/1994 | Austin | .......................... 359/885 |
| 2007/0188871 A1 | * | 8/2007 | Fleury et al. | .................. 359/586 |

FOREIGN PATENT DOCUMENTS

| CN | 1729409 A | | 2/2006 |
| GB | 2371562 A | * | 7/2002 |

* cited by examiner

*Primary Examiner* — Stephone Allen
*Assistant Examiner* — Kimberly N Kakalec
(74) *Attorney, Agent, or Firm* — Altis Law Group, Inc.

(57) ABSTRACT

A article includes a substrate and a metal dielectric reflective film. The metal dielectric reflective film is formed on the substrate, the metal dielectric reflective film includes a dielectric multiple layer and a metal layer. The dielectric multiple layer includes a first layer, a second layer, a third layer, and a fourth layer arranged in the order written and stacked one on another. The first and third layers comprised of a low refractive index material, the second and fourth layers comprised of a high refractive index material. The metal layer is disposed on the fourth layer.

4 Claims, 3 Drawing Sheets

ARTICLE HAVING METAL DIELECTRIC REFLECTIVE FILM

BACKGROUND

1. Technical Field

The present disclosure relates to reflective films and, particularly, to an article having a metal dielectric reflective film.

2. Description of Related Art

Reflective films have been extensively applied to articles to enhance the reflectivity of the articles. However, reflection wavelength range of current reflective films is unsatisfactorily wide, such as 400 nm to 650 nm, resulting in colorful reflection.

Therefore, an article having the metal dielectric reflective film which can overcome the above-described problems is desirable.

DETAILED DESCRIPTION

Embodiments of the disclosure are now described in detail with reference to the drawings.

Figure 1:
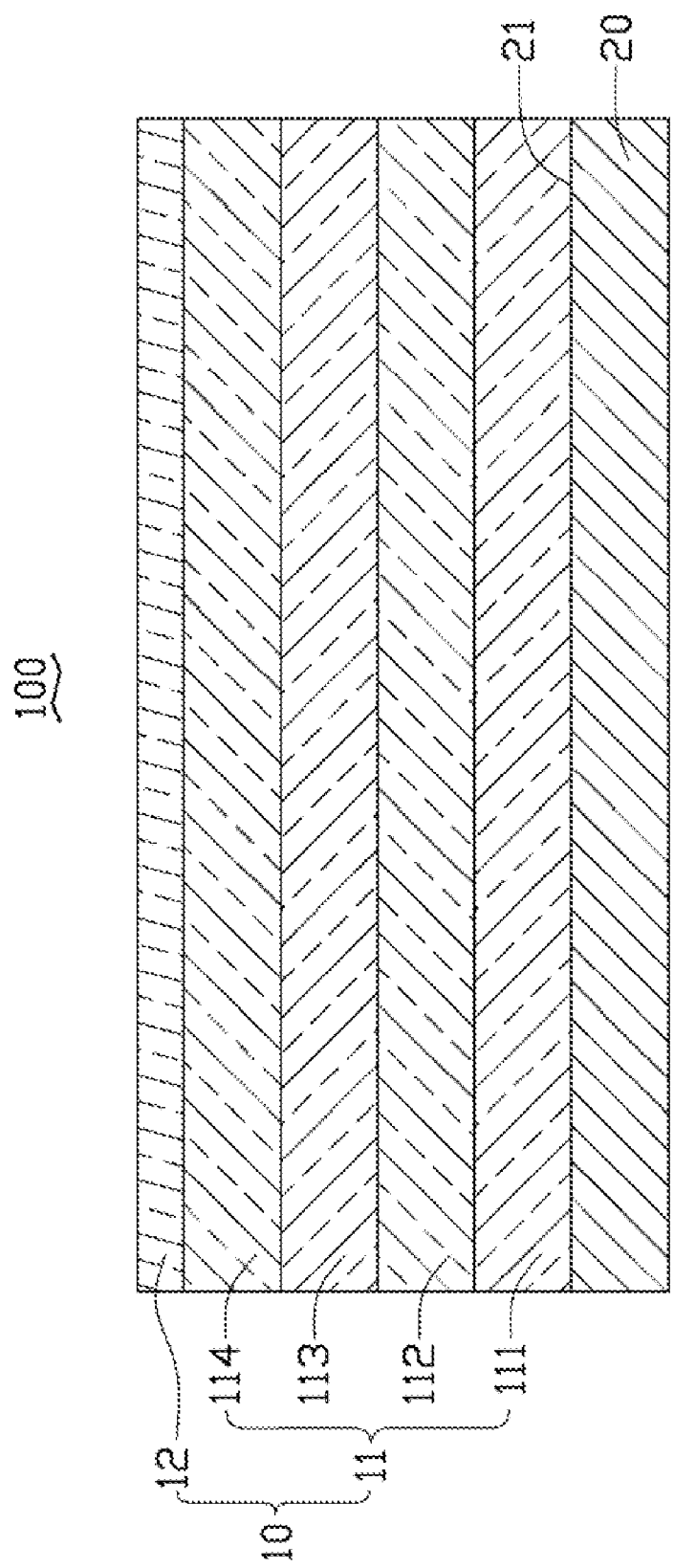
FIG. 1 is a cross-sectional, schematic view of an article in accordance with an embodiment.

Referring to the FIG. 1, an article 100, according to an exemplary embodiment, includes a substrate 20 made from opaque material such as metal or plastic, and a metal dielectric reflective film 10 formed on the substrate 20. The article 100 can be a mobile phone, computer or other portable electronic device.

The metal dielectric reflective film 10 includes a dielectric multiple layer 11 formed on the substrate 20 and a metal layer 12 disposed on the dielectric multiple layer 11.

The dielectric multiple layer 11 includes a first layer 111, a second layer 112, a third layer 113, and a fourth layer 114 arranged in the order written and stacked one on another. Each of the first and third layers 111, 113 is comprised of a low refractive index material. The refractive index of the low refractive index material is in the range from about 1.63 to about 1.68. In this embodiment, the low refractive index material is aluminum trioxide ($Al_2O_3$). Each of the second and fourth layers 112, 114 is comprised of a high refractive index material. The refractive index of the high refractive index material is in the range from about 1.76 to about 1.87. In this embodiment, the high refractive index material is silicon nitride ($Si_3N_4$). The thickness of the first layer is in the range from about 45.59 nm to about 81.59 nm. The thickness of the second layer is in the range from about 46.83 nm to about 86.38 nm. The thickness of the third layer is in the range from about 58.52 nm to about 104.72 nm. The thickness of the fourth layer is in the range from about 50.76 nm to about 93.63 nm.

The metal layer 12 is made of metal material with reflectivity over 60%, such as silver (Ag), aluminum (Al), or chromium (Cr). The thickness of the metal layer 12 is in the range from about 3 nm to about 15 nm.

Figure 2:
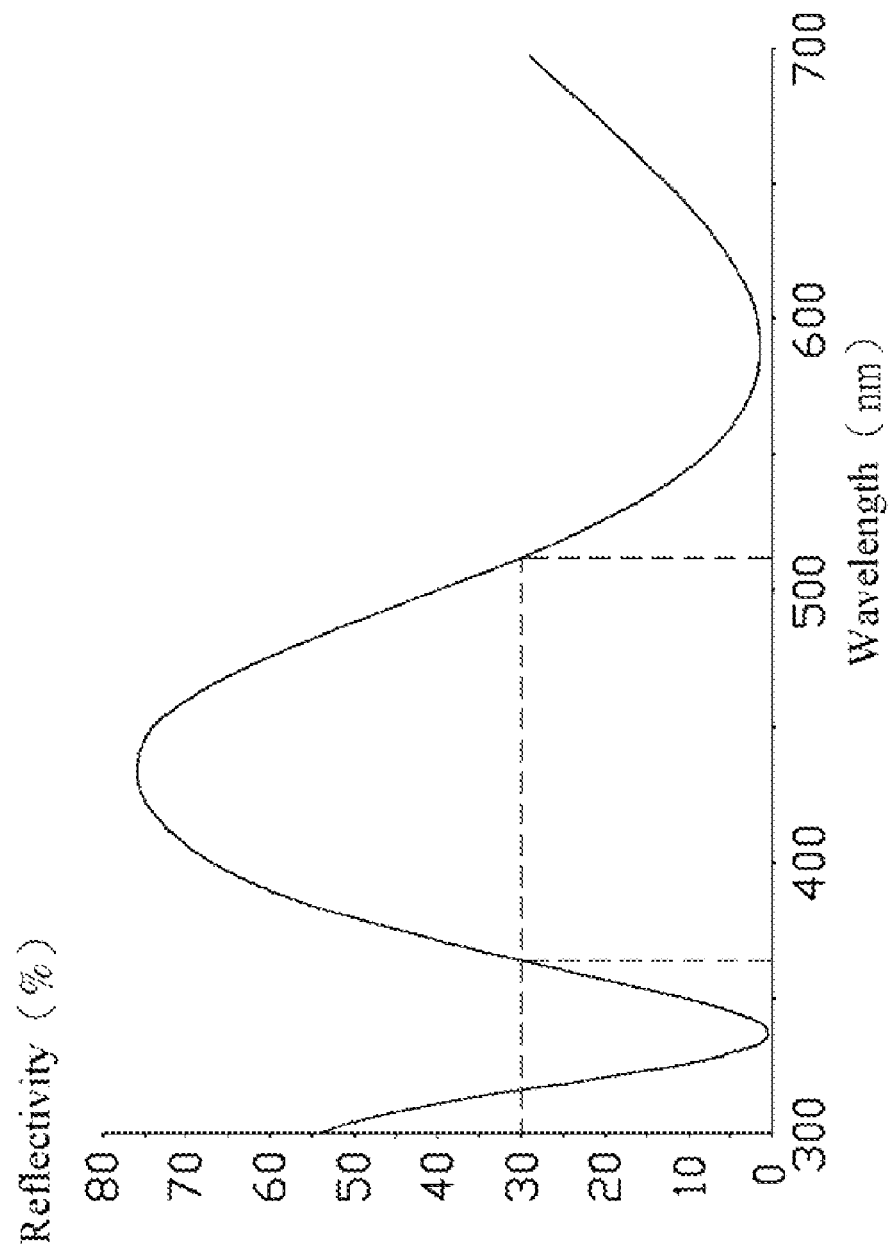
FIG. 2 is a graph showing reflection characteristics of the article having the metal dielectric reflective film of FIG. 1.

Reflection characteristics of the metal dielectric reflective film 10 under nature right are shown in FIG. 2. Reflection wavelength with reflectivity over 30% is in the range from about 370 nm to about 520 nm, generally corresponding to monochromic blue light.

Figure 3:
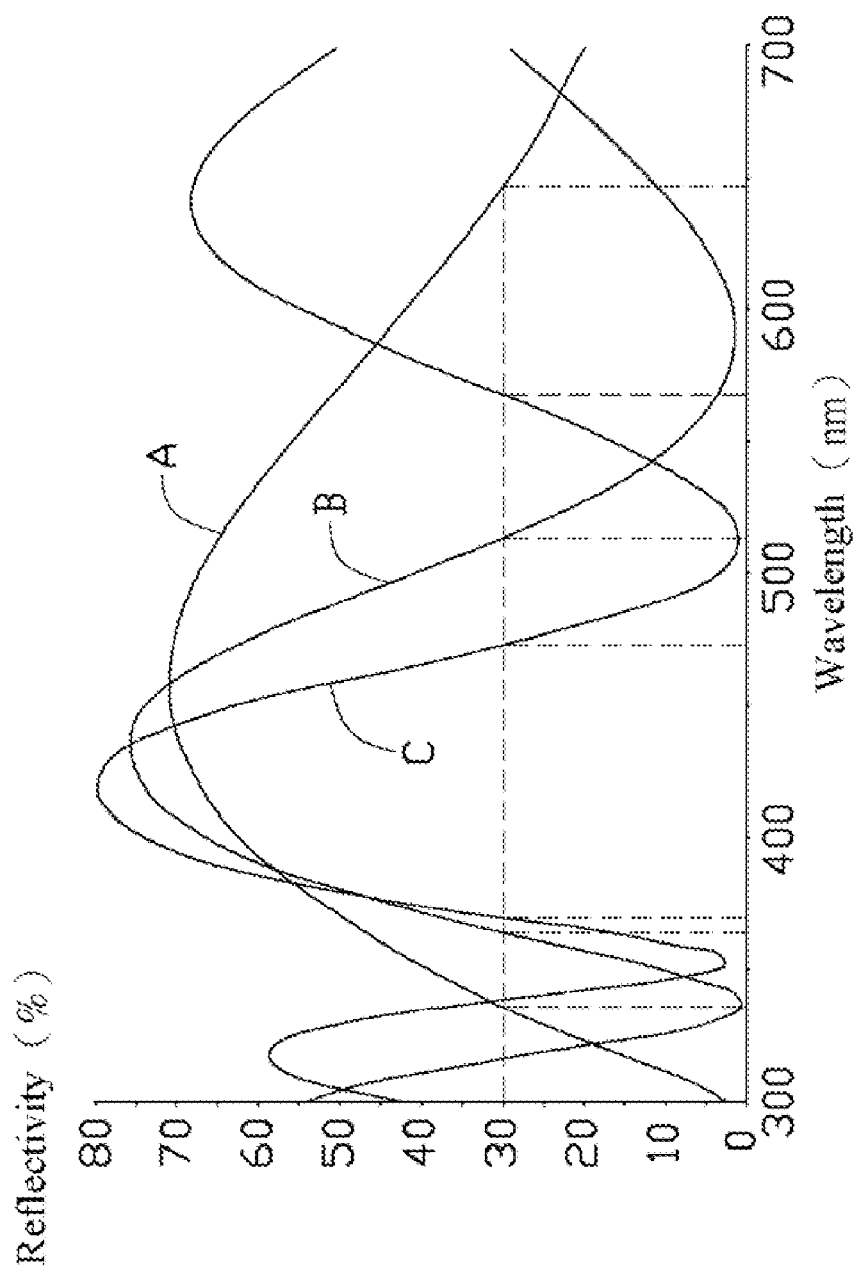
FIG. 3 is a graph showing reflection characteristics of three different metal dielectric reflective films.

Referring to the FIG. 3, curve A represents reflection characteristics of a first comparable reflective film consisting of a lower reflection index layer and a high reflection layer. Curve B represents reflection characteristics of the metal dielectric reflective film 10. Curve C represents reflection characteristics of a second comparable reflective film consisting of three low reflection index layers and three high reflection index layers stacked in an alternating fashion. As indicated in FIG. 3, reflection wavelength with reflectivity over 30% of the first comparable reflective film ranges from about 340 nm to about 650 nm, corresponding to more than one color. Reflection wavelength with reflectivity over 30% of the second comparable reflective film ranges from about 360 nm to about 460 nm and from about 560 nm to about 700 nm respectively, corresponding to more than one color. Therefore, reflection color saturation of the metal dielectric reflective film 10 is better, as compared with the first and second comparable reflective films.

Detailed examples of the metal dielectric reflective film 10 are given below, but it should be noted that the metal dielectric reflective film 10 is not limited to these examples.

EXAMPLE 1

Material, refractive index and thickness of each layer of the metal dielectric reflective film 10 of Example 1 are shown in Table 1, wherein the d=$\lambda/(4n)$, $\lambda$=600 nm.

TABLE 1

| Layers | Material | Refractive index | Thickness (d) | Thickness (nm) |
|---|---|---|---|---|
| First layer | Al2O3 | 1.65760 | 0.19207817 | 69.53 |
| Second layer | Si3N4 | 1.78301 | 0.21833229 | 73.47 |
| Third layer | Al2O3 | 1.65760 | 0.24653466 | 89.24 |
| Fourth layer | Si3N4 | 1.78301 | 0.23666484 | 79.64 |
| Metal layer | Cr | 3.42732 | 0.01713658 | 3.00 |

Reflection wavelength reflected by the metal dielectric reflective film 10 of Example 1 and the reflectivity is over 30%, is in the range from about 480 nm to about 650 nm.

EXAMPLE 2

Material, refractive index and thickness of each layer of the metal dielectric reflective film 10 of Example 1 are shown in Table 1, wherein the d=$\lambda/(4n)$, $\lambda$=490 nm.

TABLE 2

| Layers | Material | Refractive index | Thickness (d) | Thickness (nm) |
|---|---|---|---|---|
| First layer | Al2O3 | 1.65807 | 0.19207817 | 56.76 |
| Second layer | Si3N4 | 1.80455 | 0.21833229 | 59.28 |
| Third layer | Al2O3 | 1.65807 | 0.24653466 | 72.86 |
| Fourth layer | Si3N4 | 1.80455 | 0.23666484 | 64.26 |
| Metal layer | Cr | 2.48856 | 0.01523606 | 3.00 |

Reflection wavelength reflected by the metal dielectric reflective film 10 of Example 1 and the reflectivity is over 30%, is in the range from about 400 nm to about 540 nm.

Although reflection wavelength range of Example 1 and Example 2 are different with each other, the reflection wavelength ranges are narrowly. Therefore, reflection color saturation of the metal dielectric reflective film 10 of Example 1 and Example 2 are relatively better.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. An article comprising:
    a substrate; and
    a metal dielectric reflective film formed on the substrate, the reflection wavelength with reflectivity over 30% of the metal dielectric reflective film being in the range from about 370 nm to about 520 nm; the metal dielectric reflective film consisting of:
    a dielectric multiple layer consisting of a first layer, a second layer, a third layer, and a fourth layer arranged in the order written and stacked one on another, the first and third layers comprised of a low refractive index material, the second and fourth layers comprised of a high refractive index material; wherein the refractive index of the low refractive index material is in the range from about 1.63 to about 1.68, and the refractive index of the high refractive index material is in the range from about 1.76 to about 1.87; and
    a metal layer disposed on the fourth layer.

2. The article in claim 1, wherein the low refractive index material is $Al_2O_3$, and the high refractive index material is $Si_3N_4$.

3. The article in claim 1, wherein the metal layer has a reflectivity of light is greater than 60%.

4. The article in claim 3, wherein a thickness of the metal layer is in the range from about 3 nm to about 15 nm.

* * * * *